United States Patent [19]

Maryyanek et al.

[11] Patent Number: 4,921,512
[45] Date of Patent: May 1, 1990

[54] FILTER ELEMENT

[75] Inventors: Richard D. Maryyanek, Northbridge; June E. Brissette, Oxford, both of Mass.

[73] Assignee: American Optical Corporation, Southbridge, Mass.

[21] Appl. No.: 331,686

[22] Filed: Mar. 30, 1989

[51] Int. Cl.$^5$ .................. B01D 39/06; B01D 46/12
[52] U.S. Cl. ........................ 55/488; 55/316; 55/486; 55/492; 55/507; 55/527; 55/DIG. 33; 55/DIG. 35
[58] Field of Search ............. 55/316, 387, 485–489, 55/492, 498, 503, 505–507, 527, 528, DIG. 33, DIG. 35

[56] References Cited

U.S. PATENT DOCUMENTS

| | | | |
|---|---|---|---|
| 1,963,874 | 6/1934 | Stampe | 55/316 |
| 2,122,111 | 6/1938 | Poelman et al. | 55/316 |
| 2,264,829 | 12/1941 | Cover | 55/DIG. 35 |
| 2,575,483 | 11/1951 | Bethig | 55/316 |
| 2,744,523 | 5/1956 | Malcolm, Jr. et al. | 55/316 X |
| 2,744,525 | 5/1956 | Whipple | 55/DIG. 35 |
| 2,787,333 | 4/1957 | Boone et al. | 55/316 |
| 2,825,424 | 3/1958 | Gross | 55/316 |
| 2,910,763 | 11/1959 | Lauterbach | 55/528 X |
| 2,994,404 | 8/1961 | Schifferly | 55/316 X |
| 3,142,549 | 7/1964 | Klusewitz et al. | 55/316 |
| 3,527,235 | 9/1970 | Fidelman | 55/485 X |
| 4,064,876 | 12/1977 | Mulchi | 55/DIG. 33 |
| 4,070,519 | 1/1978 | Lefkowitz et al. | 55/528 X |
| 4,088,461 | 5/1978 | Brauer | 55/DIG. 35 |
| 4,093,437 | 6/1978 | Ichihara et al. | 55/528 X |
| 4,179,274 | 12/1979 | Moon | 55/DIG. 35 |
| 4,294,599 | 10/1981 | Grovesteen et al. | 55/DIG. 35 |
| 4,334,901 | 6/1982 | Ayes et al. | 55/DIG. 35 |
| 4,522,876 | 6/1985 | Hiers | 55/528 X |

FOREIGN PATENT DOCUMENTS

| | | | |
|---|---|---|---|
| 1800826 | 7/1969 | Fed. Rep. of Germany | 55/316 |
| 101375 | 4/1941 | Sweden | 55/486 |
| 112495 | 11/1944 | Sweden | 55/486 |
| 516268 | 12/1939 | United Kingdom | 55/316 |

Primary Examiner—Robert Spitzer
Attorney, Agent, or Firm—Fishman, Dionne & Cantor

[57] ABSTRACT

A snap-on filter for chemical cartridges is presented which includes a filter element comprising a perforated fiberglass prefilter bonded to a felt filter. The filter element is contained within a filter housing which snaps onto the chemical cartridge of a standard gas mask. The fiberglass prefilter is perforated to provide a passage way for fumes into the interior of the filter as well as the filter surface. The perforations increase the overall surface area of the prefilter for filtration. This feature enhances the efficiency and overall life of the filter element.

13 Claims, 2 Drawing Sheets

FILTER ELEMENT

BACKGROUND OF THE INVENTION

The present invention relates to the field of respirator cartridges. More particularly, the present invention relates to a prefilter system comprised of two circular filter elements positioned in a snap-on housing. The prefilter system comprises a fiberglass filter element which is perforated by sixty-four Pins and is adhesively bonded to a felt filter element. The Perforation of the fiberglass filter breaks up and fractures the binder used in the manufacture of the fiberglass. This allows a contaminant to penetrate into the body of the prefilter. The filter housing snaps onto the chemical cartridge of a respirator or gas mask.

Filter elements which clip or snap onto chemical cartridges of gas masks are well known. Unfortunately, such prior art filters suffer from premature clogging. This clogging results from dust and other particulate matter caking on the surface of the filter. The clogging problem is exacerbated in a dusty environment. When large amounts of dust or particles are present, the filter cake forms at a rapid rate, to a point in which the filter is no longer functional. Moreover, because the prior art filters are flat on their outer surface (the surface on which the cake forms) most of the filter is never used before the filter loses its functionality.

SUMMARY OF THE INVENTION

The above-discussed and other problems and disadvantages of the prior art are overcome or alleviated by the filter element of the present invention. In accordance with the present invention, the filter element includes a two layer construction comprising one layer of fiberglass and a second layer of felt. Both layers are secured together by an adhesive. The filter assembly is received in a molded snap-on housing. This housing snaps onto the cartridge of a respirator or gas mask.

In an important feature of the present invention, the fiberglass prefilter is perforated (preferably by sixty-four pins) in the die when the filter is being blanked out. Such perforations act to break up and fracture the binder used in manufacture of the fiberglass. This allows contaminant entering the filter to penetrate below the filter surface and into the body of the prefilter. The perforations also reduce surface loading (caking) and consequently improve the final resistance of the filter. As a result, the filter of this invention has an extended life relative to the prior art filter elements.

The filter housing completely encloses the filter element. At the top of the filter clip are preferably eight tabs. These tabs mate with and compress the fiberglass prefilter. The tabs act to create channels through which aerosol contaminant can pass to a plenum around the periphery of the fiberglass prefilter. At this point, an aerosol contaminant is allowed to enter the prefilter from the side, further reducing surface loading and final resistance. This important feature of the present invention also extends the life of the filter element.

The above-discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
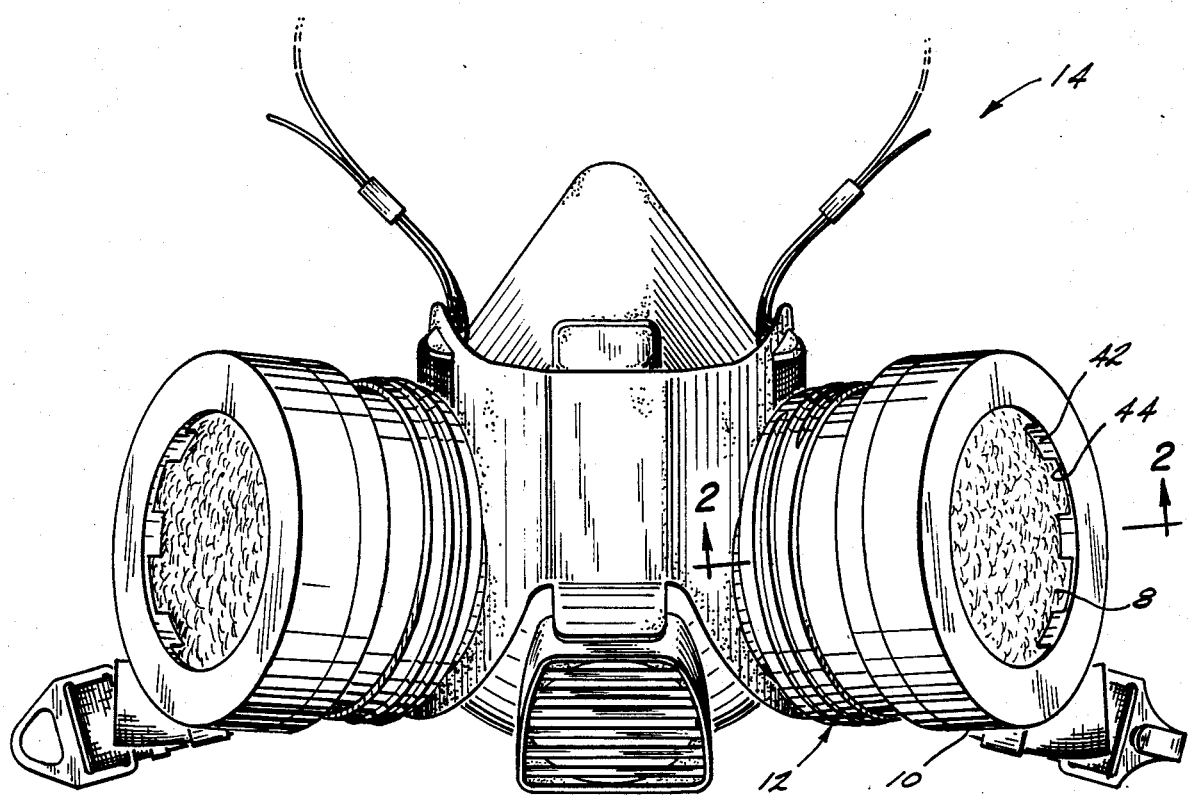
FIG. 1 is a front perspective view of a gas mask incorporating the filter element of the present invention.
Figure 2:
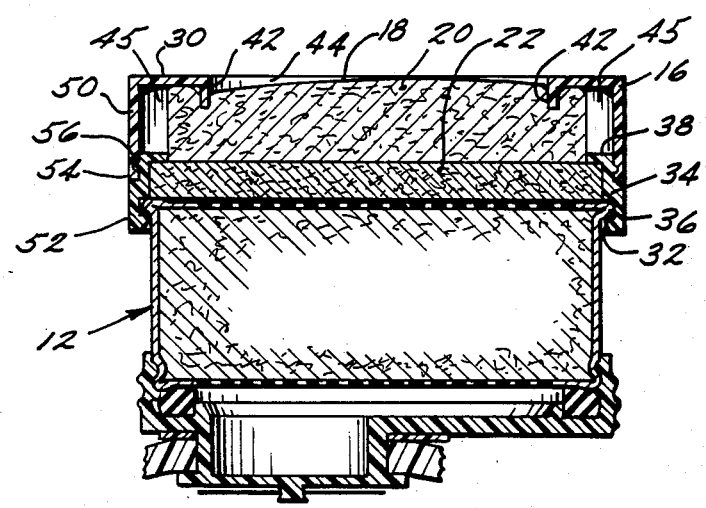
FIG. 2 is a cross-sectional view along the line 2—2 of FIG. 1 depicting the filter element of the present invention attached to a chemical cartridge.
Figure 3:
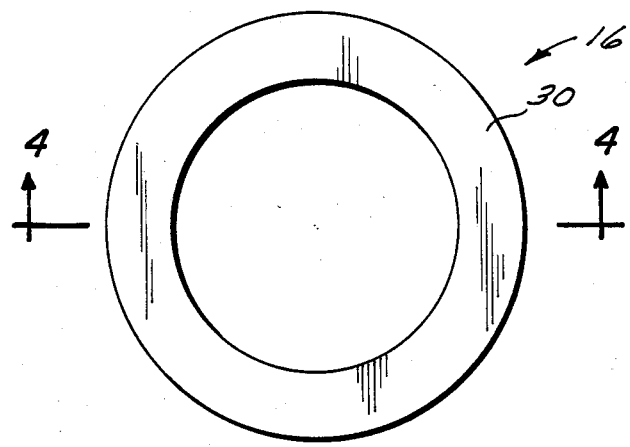
FIG. 3 is a top elevation view of the filter element housing for the filter element of FIG. 1.
Figure 6:
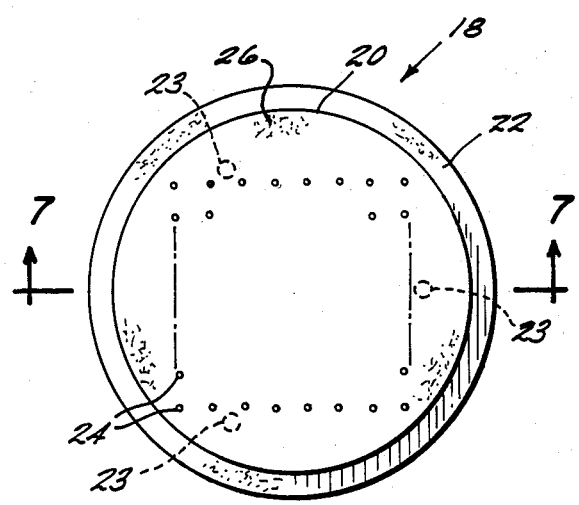
FIG. 6 is a top elevation view of a filter element in accordance with the present invention.
Figure 7:
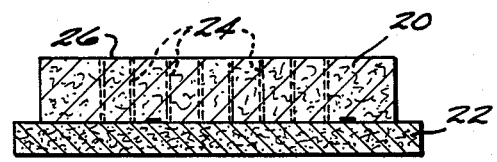
FIG. 7 is a cross sectional elevation view along the line 7—7 of FIG. 6.

Referring first to FIGS. 1 and 2, a filter in accordance with the present invention is shown generally at 10 subsequent to being removably snapped or clipped onto a known chemical cartridge 12 of a known gas mask 14. In this case, the chemical cartridge is a model R51A manufactured by American Optical Corporation, assignee of the present invention. Filter 10 is comprised of two main elements including a filter housing 16 (FIGS. 3-5) and a filter element 18 (FIGS. 6 and 7). Filter housing 16 receives and encloses filter element 18.

Referring now to FIGS. 2, 6 and 7, filter element 18 comprises two filter sections including a fiberglass prefilter 20 adhesively attached to a felt filter 22. In a preferred embodiment, fiberglass prefilter 20 is ½ inch thick and is secured to felt filter 22 (which is ¼ inch thick) by three drops of hot melt adhesive located 120° apart on a two inch diameter (see items 23 in FIG. 6). It will be appreciated that both the dimensions of, and the method of, securing or adhering the filters may be changed. While the dimensions and securing methods discussed are preferred, any number of dimensions or securing methods may be used without detracting from the benefits of the present invention.

In an important feature of the present invention, fiberglass prefilter 20 has a plurality of spaced perforations 24. Perforations 24 extend from the outer surface 26 of prefilter 20 into the body of prefilter 20. Perforations 24 are formed by a plurality of pins, preferably an 8×8 array of sixty-four pins, which are located in the cutting die when prefilter 20 is being cutout. Perforation of the fiberglass prefilter 20 breaks up and fractures the binder used in the manufacture of the fiberglass. This allows any contaminant (which filter 10 is to filter) to penetrate below outer surface 26 of prefilter 20 into the interior of prefilter 20. As a result, filter element 18 has reduced surface loading or caking of particulate material during use. This improves the flow of air through filter 10 and consequently reduces the final pressure resistance of filter 10.

Felt filter 22 is preferably comprised of a fiber mixture comprised of 50% wool and 50% polypropylene; and has an outer diameter which is larger than the diameter of prefilter 20.

Fiberglass prefilter 20 and felt filter 22 are bonded to form filter element 18 which is then positioned into filter housing 16. Turning to FIGS. 2 and 3-5, filter housing 16 comprises a molded resilient cylindrical open-ended cap having a flat annular top surface 30.

Figure 4:
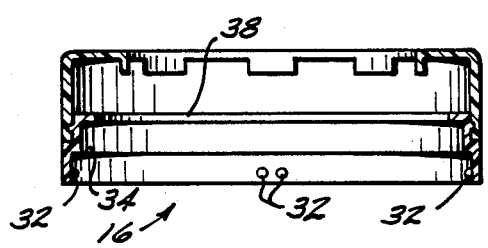
FIG. 4 is a cross-sectional elevation view along line the 4—4 of FIG. 3.
Figure 5:
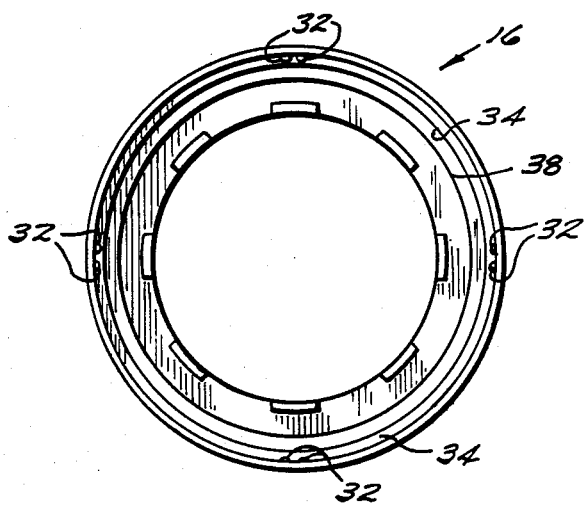
FIG. 5 is a bottom elevation view of the filter element housing of FIG. 3.

As shown in FIGS. 2, 4 and 5, the lower interior of housing 16 includes four spaced groups of pairs of semi-spherical lugs 32 which are adjacent a shoulder 34. The space between shoulder 34 and lugs 32 is preselected to receive a lip 36 from known chemical cartridge 12.

The interior of housing 16 also includes an approximately centrally located flat annular ring 38 extending outwardly therefrom. As best seen in FIG. 2, ring 38 is positioned to securely retain felt filter 22 in place subsequent to attachment of housing 16 onto cartridge 12.

Along the interior rim of top surface 30 are a plurality of spaced, depending tabs 42 (preferably eight). Tabs 42 extend towards the interior of filter housing 16. As shown in FIGURE 2, tabs 42 compress prefilter 20 which results in a plurality of gaps 44 between surface 30 and fiberglass prefilter 20 which allows air to pass into plenum 45. As a result, air entering prefilter 20 will pass both through the surface of prefilter 20, and through gaps 44 into the sides of prefilter 20, thus also utilizing the sides of prefilter 20 for filtering which radically increases the surface area of the filter.

While filter housing 16 may be a single one piece molded unit, in the embodiment shown in FIGS. 2 and 4, housing 16 includes a lower housing portion 50 and an upper housing portion 52 which snap together. The snap attachment is accomplished by an annular ring 54 on lower portion 52 being received in a matching recess 56 on upper portion 50. This two piece system is necessary to manufacture the plenum design as it is difficult, if not impossible, to injection mold the housing in one piece.

As mentioned, elements 32 comprise fastening means for fastening filter housing 16 to chemical cartridge 12. Thus, once filter element 18 is assembled into filter housing 16, the whole unit is snapped onto chemical cartridge 12. This easy snap action and disassembly allows for easy replacement of filter element 18.

The filter cartridge of the present invention is very effective at preventing contaminants from passing therethrough. In accordance with prescribed NIOSH test standards, the following tests were conducted to determine the penetration of an array of substances through the filter which was attached to a chemical cartridge 12.

A. TEST PROCEDURE

All filters and cartridges were tested as a single element without a respirator. All tests were conducted in accordance with NIOSH requirements in 30 CFR 11.
1. 30 CFR 11, Subpart K, Section 11.140-4, Silica Dust Test
2. 30 CFR 11, Subpart K, Section 11.140-6, Lead Fume Test
3. 30 CFR 11, Subpart K, Section 11.140-7, Silica Mist Test
4. 30 CFR 11, Subpart K, Section 11.140-9, Airflow Resistance Test
5. 30 CFR 11, Subpart L, Section 11.162-1, Resistance Test
6. 30 CFR 11, Subpart L, Section 11.162-5, Lacquer
7. 30 CFR 11, Subpart L, Section 11.162-6, Enamel

ANALYSIS OF RESULTS

A review of the data presented in the following tables I–V shows no failures occurred in filter elements having the structure shown in FIG. 2 due to the penetration of silica dust, silica mist, lead fume, lacquer paint mist, or enamel paint mist. A review of the data presented in the tables also shows no failures occurred due to airflow resistance.

TABLE I

LEAD FUME TEST, 312 MINUTES
TEST CONDUCTED ON AN R53A CARTRIDGE

| No. | Initial Resistance NIOSH Max. 50 mm | Final Resistance NIOSH Max. 70 mm | Penetration NIOSH Max. 75 mg |
|---|---|---|---|
| 1 | 34.0 | 63.0 | .30 |
| 2 | 40.0 | 62.5 | .43 |
| 3 | 38.5 | 64.0 | .64 |
| 4 | 31.5 | 58.0 | .48 |
| 5 | 34.0 | 67.5 | .34 |
| 6 | 32.5 | 64.5 | .48 |
| 7 | 32.5 | 66.5 | .35 |
| 8 | 33.5 | 61.5 | .48 |
| 9 | 34.5 | 62.0 | .31 |
| 10 | 31.5 | 59.0 | .38 |
| 11 | 34.5 | 60.5 | .36 |
| 12 | 33.5 | 64.0 | .48 |
| 13 | 32.5 | 55.0 | .36 |
| 14 | 32.5 | 53.0 | .40 |
| 15 | 32.0 | 55.5 | .39 |
| 16 | 32.5 | 60.0 | .52 |

TABLE II

SILICA DUST TEST, 90 MINUTES
TEST CONDUCTED ON AN R53A CARTRIDGE

| No. | Initial Resistance NIOSH Max. 50 mm | Final Resistance NIOSH Max. 70 mm | Penetration NIOSH Max. 75 mg |
|---|---|---|---|
| 1 | 32.0 | 33.5 | 0 |
| 2 | 34.0 | 35.5 | 0 |
| 3 | 32.5 | 34.0 | 0 |
| 4 | 34.5 | 36.0 | 0 |

TABLE III

SILICA MIST TEST, 312 MINUTES
TEST CONDUCTED ON AN R53A CARTRIDGE

| No. | Initial Resistance NIOSH Max. 50 mm | Final Resistance NIOSH Max. 70 mm | Penetration NIOSH Max. 75 mg |
|---|---|---|---|
| 1 | 32.0 | 33.5 | 0 |
| 2 | 34.0 | 35.5 | 0 |
| 3 | 32.5 | 34.0 | 0 |
| 4 | 34.5 | 36.0 | 0 |

TABLE IV

LACQUER PAINT MIST TEST, 156 MINUTES
TEST CONDUCTED ON AN R51A CARTRIDGE

| No. | Initial Resistance NIOSH Max. 50 mm | Final Resistance NIOSH Max. 70 mm | Penetration NIOSH Max. 75 mg |
|---|---|---|---|
| 1 | 31.0 | 44.0 | 0 |
| 2 | 30.0 | 41.0 | 0 |
| 3 | 28.5 | 42.0 | 0 |

TABLE V

ENAMEL MIST TEST, 156 MINUTES
TEST CONDUCTED ON AN R51A CARTRIDGE

| No. | Initial Resistance NIOSH Max. 50 mm | Final Resistance NIOSH Max. 70 mm | Penetration NIOSH Max. 75 mg |
|---|---|---|---|
| 1 | 32.5 | 36.0 | 0 |
| 2 | 30.5 | 34.0 | 0 |
| 3 | 32.0 | 35.0 | 0 |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A filter for filtration of air entering a chemical cartridge of a gas mask, the filter comprising:
   a filter element for filtration of particulate contaminants from an air stream, said filter element including:
      (1) a prefilter having a plurality of spaced perforations therethrough; and
      (2) a secondary filter bonded to said prefilter;
   filter housing means for housing said filter element, said filter housing including mounting means for mounting onto a chemical cartridge of a gas mask.

2. The filter of claim 1 wherein:
   said plurality of spaced perforations comprises an array of symmetrically arranged perforations.

3. The filter of claim 2 including about 64 perforations.

4. The filter of claim 1 wherein:
   said filter housing includes an annular face, said face having depending spaced tabs facing into and compressing said prefilter, said tabs directing air to pass to sides of said prefilter.

5. The filter of claim 1 wherein:
   said prefilter and said secondary filter are both circular, said prefilter having a diameter smaller than the diameter of said secondary filter.

6. The filter of claim 5 wherein:
   said filter housing means includes an inner annular ring for retaining said secondary filter.

7. The filter of claim 1 wherein:
   said mounting means comprises a plurality of spaced protrusions circumferentially located along the interior of said housing and a circular shoulder spaced from said protrusions.

8. The filter of claim 1, wherein said filter housing means comprises two housing pieces and means for releasably joining said housing pieces.

9. The filter of claim 1 wherein:
   said prefilter comprises a fiberglass prefilter.

10. The filter of claim 9 wherein:
    said secondary filter comprises a felt filter.

11. The filter of claim 10 wherein:
    said felt filter is comprised of a mixture of wool fibers and polypropylene fibers.

12. The filter of claim 1 wherein:
    said secondary filter comprises a felt filter.

13. The filter of claim 12 wherein:
    said felt filter is comprised of a mixture of wool fibers and polypropylene fibers.

* * * * *